(12) United States Patent
Bellifemine et al.

(10) Patent No.: US 11,486,730 B2
(45) Date of Patent: Nov. 1, 2022

(54) SYSTEM AND METHOD FOR MANAGING SUPPLY OF ELECTRIC ENERGY THROUGH CERTIFIED MEASURES

(71) Applicant: TELECOM ITALIA S.p.A., Milan (IT)

(72) Inventors: Fabio Luigi Bellifemine, Turin (IT); Danilo Gotta, Turin (IT); Tiziana Trucco, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 116 days.

(21) Appl. No.: 16/754,892

(22) PCT Filed: Oct. 17, 2018

(86) PCT No.: PCT/EP2018/078392
§ 371 (c)(1),
(2) Date: Apr. 9, 2020

(87) PCT Pub. No.: WO2019/081298
PCT Pub. Date: May 2, 2019

(65) Prior Publication Data
US 2021/0199467 A1    Jul. 1, 2021

(30) Foreign Application Priority Data
Oct. 26, 2017   (IT) .................. 102017000121670

(51) Int. Cl.
*G01D 4/00* (2006.01)
*B60L 53/68* (2019.01)
(Continued)

(52) U.S. Cl.
CPC .............. *G01D 4/004* (2013.01); *B60L 53/16* (2019.02); *B60L 53/665* (2019.02); *B60L 53/68* (2019.02);
(Continued)

(58) Field of Classification Search
CPC ......... B60L 53/68; B60L 53/16; G06Q 30/04; G05Q 50/06
(Continued)

(56) References Cited

U.S. PATENT DOCUMENTS 8,588,991 B1 *  11/2013  Forbes, Jr. ............. G05B 13/02
                                                    700/295
8,896,265 B2 *  11/2014  Laberteaux ............. B60L 53/16
                                                    320/109
(Continued)

FOREIGN PATENT DOCUMENTS

WO    WO 2011/021973 A1    2/2011
WO    WO 2014/166427 A1    10/2014
WO    WO 2016/078695 A1    5/2016

OTHER PUBLICATIONS

International Search Report and Written Opinion dated Nov. 29, 2018 in PCT/EP2018/078392 filed Oct. 17, 2018.

*Primary Examiner* — Md Azad
(74) *Attorney, Agent, or Firm* — Oblon, McClelland, Maier & Neustadt, L.L.P.

(57) ABSTRACT

An electric energy supply management method includes having a certifier system define a reference electric power profile for an electric apparatus, and having the certifier system provide a device coupled to the electric apparats and to a socket that delivers electric energy provided by an electric energy supplier. The device is associated only to the electric apparatus through the reference electric power profile. The method also includes having a user of the electric apparatus couple the electric apparatus to the socket through the device, and having the device check that the electric apparatus is coupled to the socket by comparing a measured electric power profile of the electric apparatus to the reference electric power profile. If the check has a positive outcome, the method has the device collect measurements (Continued)

about the electric power used by the electric apparatus and certify them as energy consumptions of the electric apparatus.

18 Claims, 4 Drawing Sheets

(51) Int. Cl.
  *B60L 53/66* (2019.01)
  *B60L 53/16* (2019.01)
  *H02J 13/00* (2006.01)
  *G06Q 30/04* (2012.01)
  *G06Q 50/06* (2012.01)

(52) U.S. Cl.
  CPC ............ *G06Q 30/04* (2013.01); *G06Q 50/06* (2013.01); *H02J 13/00002* (2020.01)

(58) Field of Classification Search
  USPC .......................................................... 700/295
  See application file for complete search history.

(56) References Cited

U.S. PATENT DOCUMENTS

| | | | | |
|---|---|---|---|---|
| 8,930,037 B2* | 1/2015 | Brian | ..................... | G05B 15/02 |
| | | | | 700/295 |
| 9,050,901 B2* | 6/2015 | Kim | ......................... | B60L 55/00 |
| 2009/0210357 A1 | 8/2009 | Pudar et al. | | |
| 2012/0245752 A1* | 9/2012 | Borrett | ...................... | H02J 3/14 |
| | | | | 700/295 |
| 2013/0132008 A1* | 5/2013 | Borean | .................. | G06F 17/00 |
| | | | | 702/60 |
| 2016/0049789 A1* | 2/2016 | Ng | ......................... | G01D 4/002 |
| | | | | 700/295 |
| 2018/0294647 A1* | 10/2018 | Borean | .................. | G05B 15/02 |

* cited by examiner

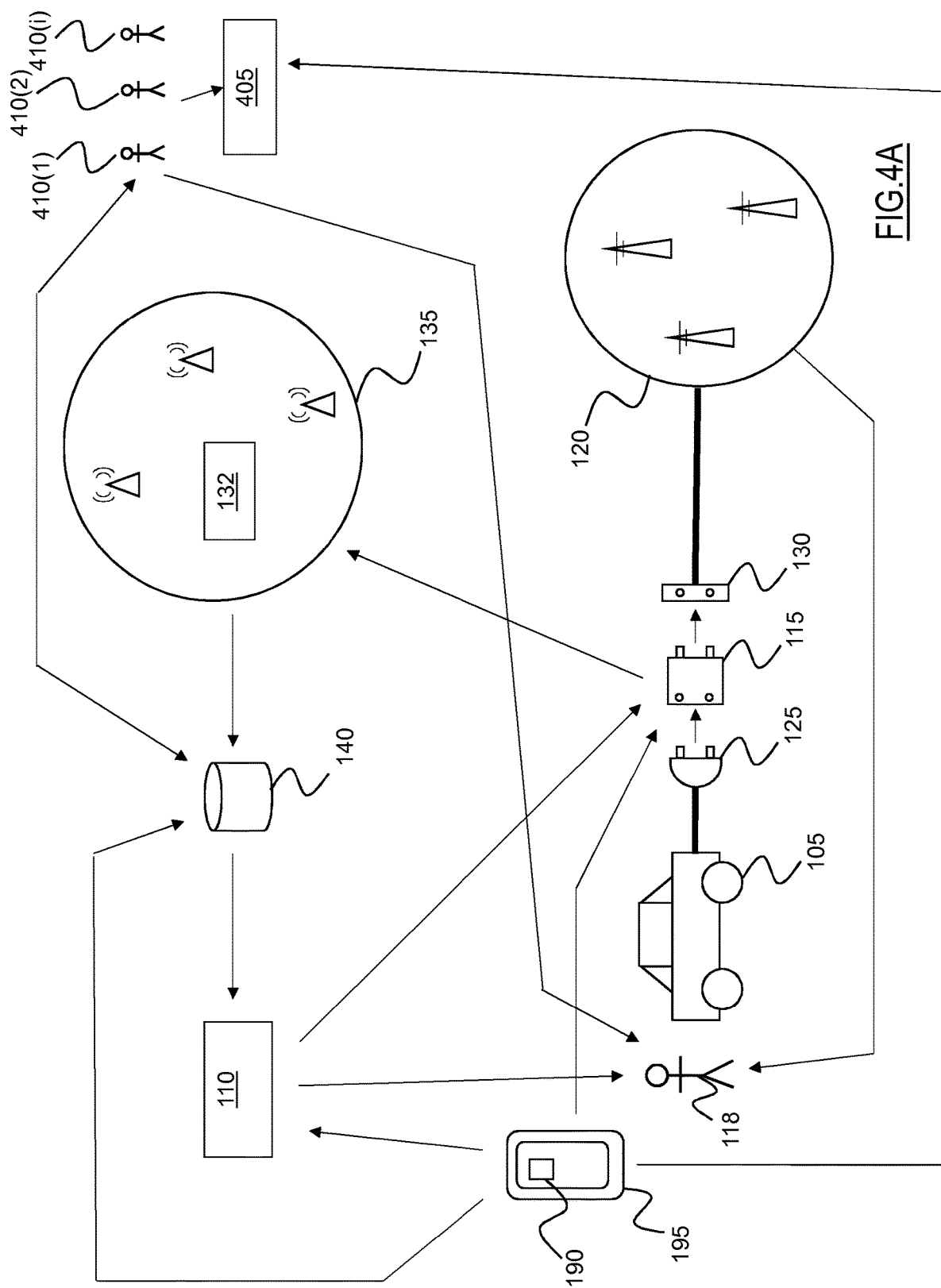

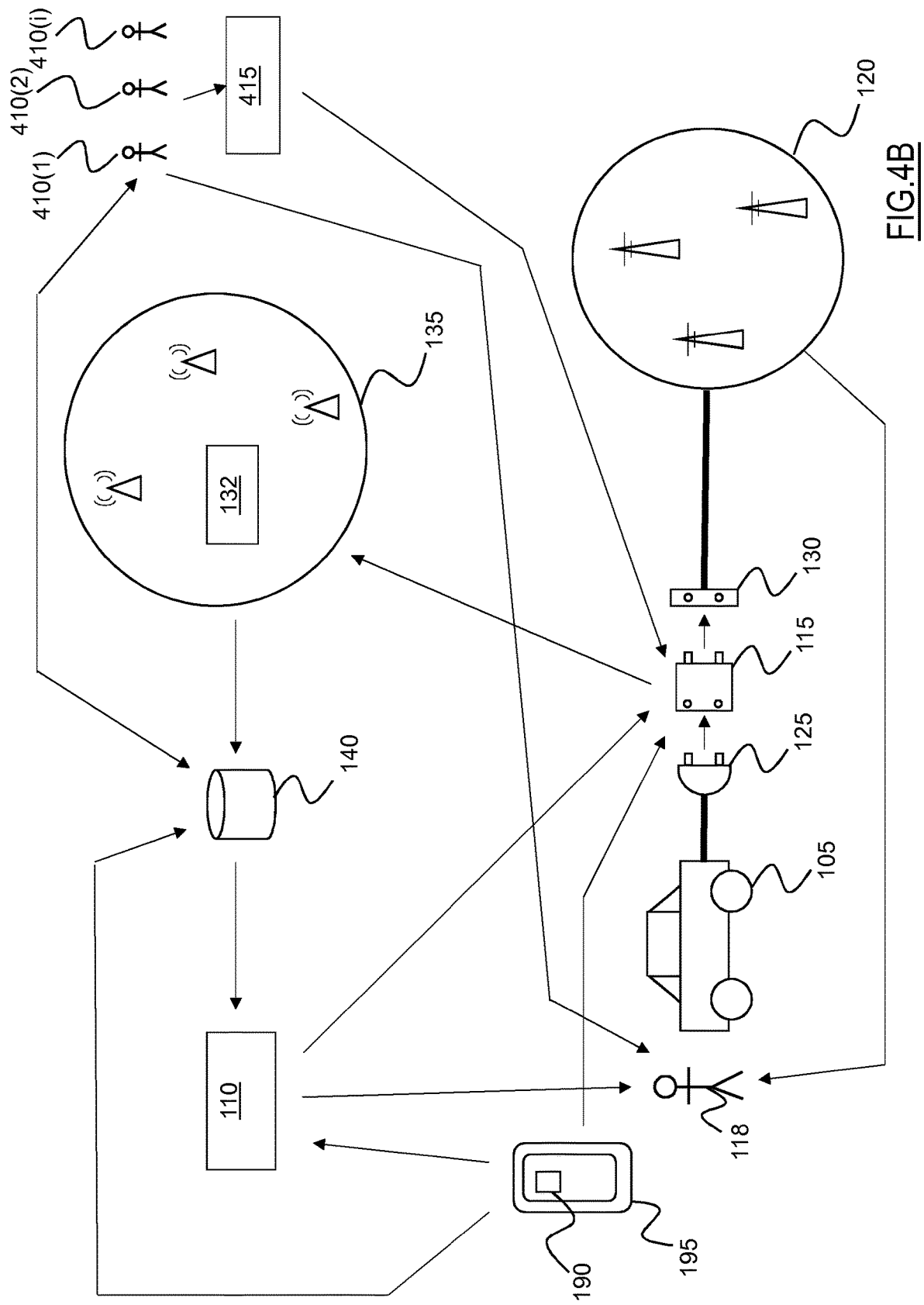

SYSTEM AND METHOD FOR MANAGING SUPPLY OF ELECTRIC ENERGY THROUGH CERTIFIED MEASURES

BACKGROUND OF THE INVENTION

Field of the Invention

The present invention relates to a system and method for managing supply of electric energy to an electric apparatus through certified measures.

Overview of the Related Art

In order to comply with energy efficiency regulations, more and more countries are adopting measures directed to promote the use of energy efficient apparatuses.

For example, special electricity supply tariffs may be made available to customers who use energy efficient apparatuses, such as in Italy where domestic customers who heat their homes exclusively by heat pumps may choose the so-called D1 tariff. The D1 tariff incentives the usage of heat pumps through a fixed cost of electricity (i.e. €/kWh) independent on the total consumption, as opposite to the progressive cost that is adopted in all the other contracts in Italy.

Another example may provide for certifying the accomplishment of energetic savings through programs directed to increase the energy efficiency. For example, a special electric socket may be installed in a private parking lot specifically designed to recharge electrical vehicles with a discount rate.

However, all these solutions are affected by some drawbacks.

In order to avail of the abovementioned special electricity tariffs for domestic customers who are using energy efficient apparatuses, the customer should modify his/her wiring system and should require the installation of an additional and dedicated electricity meter which is configured to certify the energy consumptions of the energy efficient apparatuses (e.g., the heat pumps). These are expensive, invasive and time consuming operations, which require the intervention of a qualified technician.

Moreover, the main drawback relating to the electrical sockets specifically designed to recharge electrical vehicles is the high difficulty in guaranteeing that such electrical sockets are used to recharge electrical vehicles only, and not for recharging other electric apparatuses which do not deserve for discount rates.

U.S. Pat. No. 8,896,265 B2 A discloses a charge transfer device for a plug-in electric vehicle (PEV) includes a charging cable system that supplies electric power to the PEV. The charging cable system has a first end connected to a first electrical connector that connects to the PEV for a charging operation and a second, opposite end connected to a second electrical connector for connecting to a power outlet. A meter unit is located between the first and second ends of the charging cable system. The meter unit determines electrical power information for use during the charging operation. A communications unit is located between the first and second ends of the charging cable system. The communications unit communicates the electrical power information to a remote server.

WO 2016/203448 discloses a system for distributing electrical power in roaming, comprising: at least one device for supplying electrical power in roaming provided with means for connection to a source of electrical power and a power socket for supplying the electrical power, means for interrupting electrical continuity, communication means for allowing the communication with at least one external electronic device and one or more sequences of computer instructions adapted to switch the interruption means so as to allow the supply of electrical power following a control signal sent by the external electronic device;—a management computer apparatus provided with a database which includes information regarding users in roaming and provided with one or more sequences of computer instructions configured to send information regarding a specific user to the aforementioned external electronic device;—such electronic device, for example a smartphone or tablet, owned by a user, configured to establish a first communication channel with such supply device and with such management computer apparatus so as to identify the supply device and send both the control signal and the information received from the management computer apparatus for starting the supply of electrical power thereto.

U.S. Pat. No. 9,050,901 discloses an electric vehicle charging apparatus, and more particularly, an electric vehicle charging apparatus that periodically transmits a consumed amount of power to a cost claim server, so as to claim a cost per unit time. The charging apparatus includes a charging certification unit receiving certification information of the electric vehicle, a power measurement unit generating power consumption information as a result obtained by calculating an amount of power consumed for charging the electric vehicle, and a communication unit transmitting the certification information to a certification server, and transmitting the power consumption information to a cost claim server.

US 20130132008 discloses a system for automatic identification of a device or appliance. The system includes: at least one sensor associatable with the device or appliance to be identified, and able to monitor an evolution in time of an electrical quantity indicative of device or appliance energy consumption; an analyzer communicating with the at least one sensor including receiving reports of the monitored electrical quantity, and automatically identifying the device or appliance by analyzing the evolution in time of the monitored electric quantity. The analyzing calculates a cross-correlation between the evolution in time of the monitored electric quantity and at least one reference pattern representative of at least one sample device or appliance; and when more than one sample device or appliance is included in a candidate list, identifies the device or appliance by performing a selection among the candidates based on characteristic parameters related to the respective calculated cross-correlations.

The paper "*A Comprehensive Feature Study for Appliance Recognition on High Frequency Energy Data*" by M. Kahl et. al., e-Energy '17, May 16-19, 2017, Shatin, Hong Kong, pages 121-131 evaluates a broad set of features for electrical appliance recognition, extracted from high frequency start-up events.

SUMMARY OF THE INVENTION

The Applicant has found that the solutions known in the art are not satisfactory because not efficient.

Particularly, the solutions described in U.S. Pat. No. 8,896,265 and WO 2016/203448 are not capable of automatically determining neither the type/model of the vehicle/apparatus to be supplied, nor the identity of the user.

In view of the above, the Applicant has devised a method and a system for managing the supply of electric energy to an electric apparatus by an electric energy supplier, which is capable of providing users with the possibility of availing of special electricity tariffs without forcing them to carry out expensive, invasive and time consuming operations requiring the intervention of a qualified technician, and at the same time which is capable of avoiding that such special electricity tariffs are applied in a fraudulent way.

The Applicant has thus conceived a method and system which automatically determine if the electric apparatus to be supplied/recharged is an electric apparatus authorized to avail of any special electricity tariff. Such method and system exploit a comparison between a measured electric power profile of the electric apparatus actually in operation or subject to recharge and a reference electric power profile univocally associated to the authorized electric apparatus by means of a certifier system. Such comparison is used as part of a certification process and system, to certify if the energy consumptions correspond to the electric apparatus to which the device itself has been univocally associated.

More particularly, an aspect of the present invention relates to a method for managing the supply of electric energy to an electric apparatus by an electric energy supplier.

According to an embodiment of the present invention, the method comprises having a certifier system defining a reference electric power profile of the electric apparatus.

According to an embodiment of the present invention, the method comprises having the certifier system providing a device couplable to the electric apparatus and to a socket delivering electric energy provided by the electric energy supplier; said device is univocally associated to said electric apparatus through said reference electric power profile of the electric apparatus.

According to an embodiment of the present invention, the method comprises having a user of the electric apparatus coupling, through said device, the electric apparatus to the socket for supplying electric energy.

According to an embodiment of the present invention, the method comprises having said device checking if the electric apparatus coupled to the socket through the device is the electric apparatus to which the device itself has been univocally associated, by comparing a measured electric power profile of the electric apparatus with said reference electric power profile.

According to an embodiment of the present invention, in case said check has a positive outcome, the device collects measures about the electric power absorbed by the electric apparatus and certifies them as energy consumptions corresponding to the electric apparatus to which the device itself has been univocally associated.

According to an embodiment of the present invention, the method comprises billing the user for the electric energy supplied based on said certified collected measures.

According to an embodiment of the present invention, the method comprises modifying frequency components of the measured electric power profile of the electric apparatus.

According to an embodiment of the present invention, the method comprises having said device broadcasting over power lines of the electric energy supplier a coded message when the device is coupled to the electric apparatus univocally associated thereto, and listening over the power lines for coded messages broadcasted by other meter devices.

According to an embodiment of the present invention, the method comprises having the certifier system obtaining the certified collected measures collected by the device.

According to an embodiment of the present invention, the method comprises having the certifier system calculating a credit amount based on said retrieved certified collected measures.

According to an embodiment of the present invention, the method comprises having the certifier system giving said calculated credit amount to the user.

According to an embodiment of the present invention, the method comprises having the device encrypting the certified collected measures and transmitting said encrypted certified collected measures to a connectivity platform.

According to an embodiment of the present invention, the method comprises having said connectivity platform storing the encrypted certified collected measures into a data structure.

According to an embodiment of the present invention, the method comprises having the certifier system retrieving the encrypted certified collected measures from the data structure and decrypting the encrypted certified collected measures to obtain said certified collected measures. According to an embodiment of the present invention, the method comprises said storing the encrypted certified collected measures into a data structure comprises storing the encrypted certified collected measures into a blockchain distributed data structure.

According to an embodiment of the present invention, the method further comprises having said connectivity platform enriching the received encrypted certified collected measures with geographic coordinates of the location wherein the measures have been collected.

According to an embodiment of the present invention, the method further comprises having buyers interested in buying said certified collected measures providing prices for said certified collected measures through a buyer catalog.

According to an embodiment of the present invention, the method further comprises having the user selling the right of reading said certified collected measures to a selected buyer among the buyers interested in buying said certified collected measures at the price provided in said buyer catalog by the selected buyer.

According to an embodiment of the present invention, the method further comprises having the user providing prices for said certified collected measures through a seller catalog.

According to an embodiment of the present invention, the method further comprises having a buyer buying the right of reading said certified collected measures at the prices provided on said seller catalog.

Another aspect of the present invention relates to a system for managing the supply of electric energy to an electric apparatus by an electric energy supplier.

According to an embodiment of the present invention, the system comprises a certifier system configured to define a reference electric power profile of the electric apparatus.

According to an embodiment of the present invention, the system further comprises a device couplable to the electric apparatus and to a socket delivering electric energy provided by the electric energy supplier, said device being univocally associated to said electric apparatus through said reference electric power profile of the electric apparatus.

According to an embodiment of the present invention, said device is configured to check if the electric apparatus, when coupled to the socket through the device, is the electric apparatus to which the device itself has been univocally associated, by comparing a measured electric power profile of the electric apparatus with said reference electric power profile.

According to an embodiment of the present invention, said device is further configured to collect measures about the electric power absorbed by the electric apparatus and certify them as energy consumptions corresponding to the electric apparatus to which the device itself has been univocally associated if said check has a positive outcome.

According to an embodiment of the present invention, the system comprises a connectivity platform, the device being further configured to encrypt the certified collected measures and transmitting said encrypted certified collected measures to the connectivity platform.

According to an embodiment of the present invention, said connectivity platform is configured to store the encrypted certified collected measures into a data structure.

According to an embodiment of the present invention, the certifier system is configured to retrieve the encrypted certified collected measures from the data structure and decrypt the encrypted certified collected measures to obtain said certified collected measures.

Another aspect of the present invention relates to a device couplable to an electric apparatus and to a socket delivering electric energy provided by an electric energy supplier, said device being univocally associated to said electric apparatus through a reference electric power profile of the electric apparatus defined by a certifier system.

According to an embodiment of the present invention, the device comprises first units configured to check if the electric apparatus, when coupled to the socket through the device, is the electric apparatus to which the device itself has been univocally associated, by comparing a measured electric power profile of the electric apparatus with said reference electric power profile.

According to an embodiment of the present invention, the device comprises second units configured to collect measures about the electric power absorbed by the electric apparatus.

According to an embodiment of the present invention, the device comprises third units configured to certify said collected measures as energy consumptions corresponding to the electric apparatus to which the device itself has been univocally associated if said check has a positive outcome.

BRIEF DESCRIPTION OF THE DRAWINGS

These and others features and advantages of the solution according to the present invention will be better understood by reading the following detailed description of an embodiment thereof, provided merely by way of non-limitative example, to be read in conjunction with the attached drawings, wherein:

FIGS. 4A and 4B illustrate certified measures data market scenarios according to an embodiment of the present invention.

DETAILED DESCRIPTION

Figure 1:
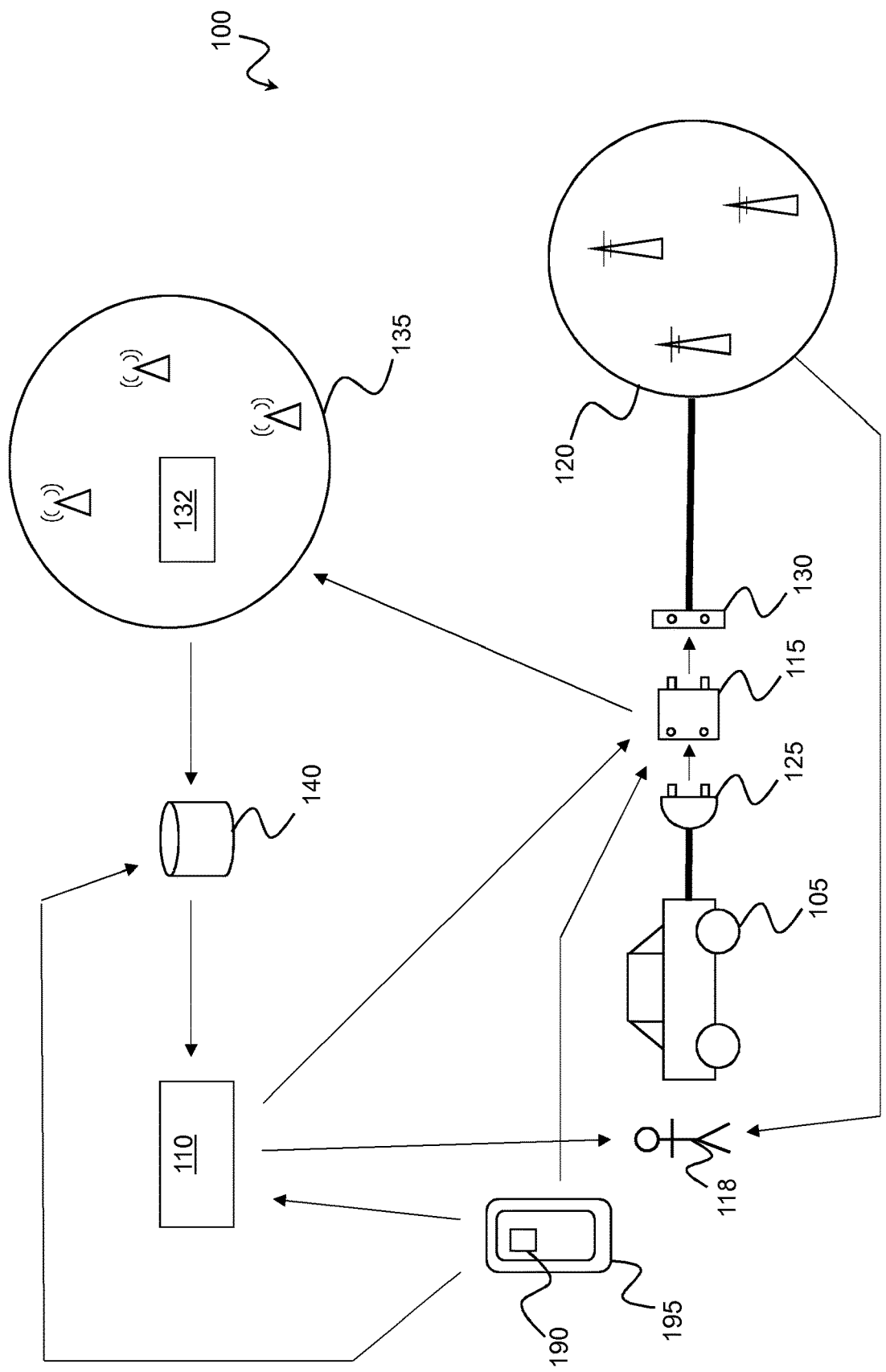
FIG. 1 illustrates a system for managing the supply of electric energy to an electric apparatus according to an embodiment of the present invention.

With reference to the drawings, FIG. 1 illustrates a system 100 for managing the supply of electric energy to an electric apparatus 105, such as for example an electric vehicle, a heat pump, a fridge, a washing machine, or any other electric apparatus for which certified incentives may be issued, according to an embodiment of the present invention.

A certifier entity 110 is configured to provide a (portable) electric meter device 115 to a user 118 of the electric apparatus 105. The electric meter device 115 is configured to collect measures about electric energy consumed by the electric apparatus 105.

According to an embodiment of the present invention, the certifier entity 110 is configured to define a reference power profile ARPP of the electric apparatus 105 which is indicative of the variation in the electrical consumption of the electric apparatus 105 over time when the latter is recharged (e.g., if the electric apparatus 105 is an electric vehicle) or is in operation (e.g., if the electric apparatus 105 is a heat pump). In the present invention the term "power profile" is used to identify the variation in the electrical load versus time. If the power use of an apparatus is observed for a period of time, such as the whole operating period, the envelope of the power waveform represents the power profile of that apparatus and becomes a useful signature to recognize that apparatus.

As will be described in greater detail in the following of the present description, said reference power profile ARPP is used as a fingerprint to univocally associate the electric meter device 115 to the electric apparatus 105.

In order to be recharged and/or to operate, the electric apparatus 105 is supplied with electric energy provided by an electric energy supplier 120. For this purpose, the electric apparatus 105 is provided with a power plug 125 to be connected to a power socket 130 of the electric energy supplier 120.

According to an embodiment of the present invention, the electric meter device 115 is couplable (i.e. coupled or configured to be coupled) to the (power plug 125 of the) electric apparatus 105 and to the power socket 130 when the electric apparatus 105 is supplied with electric energy supplied by the electric energy supplier 120.

According to an embodiment of the present invention, when the electric apparatus 105 is coupled to the power socket 130 through the electric meter device 115 which is univocally associated to said electric apparatus 105 and electric energy is being supplied to the electric meter device 115, the electric meter device 115 collects measures about electric energy consumed by the electric apparatus 105.

The measures collected by the electric meter device 115 are certified measures. In the present description, by "certified measure" it is intended a measure carried out by the electric meter device 115 on the electric energy consumed by an electric apparatus that has been assessed to be the electric apparatus which has been previously univocally associated to the electric meter device 115 through a reference power profile ARPP. As will be described in greater detail in the following of the present description, according to an embodiment of the present invention, said assessment involves an electric power fingerprint matching procedure which provides for comparing the current power profile of the electric apparatus with a reference power profile ARPP that the certifier entity 110 has associated to the electric meter device 115.

According to an embodiment of the present invention, the electric meter device 115 is configured to transmit said collected measures to a connectivity platform 132 through a telecommunication network 135 operated by a telecommunication provider, e.g. exploiting a wireless link or radio channel.

As will be described in greater detail in the following of the present description, the electric meter device 115 is configured to encrypt the collected measures before sending them to the telecommunication provider.

According to an embodiment of the present invention, the connectivity platform 132 stores the (encrypted) collected measures received from the electric meter device 115 in a corresponding data structure 140, such as for example a distributed data structure like a blockchain.

According to an embodiment of the present invention, the certifier entity 110 is configured to access the data structure 140 to retrieve the (encrypted) collected measures and to decrypt them, for example using an asymmetric key decryption algorithm. The certifier entity 110 is then configured to calculate a credit amount based on the collected measure to be provided to the user 118 in case the electric energy provided by the electric energy supplier 120 has been already billed to the user 118 in a standard way by the electric energy supplier 120. According to another embodiment of the present invention, the credit amount can be communicated by the certifier entity 110 to the electric energy supplier 120 in such a way that the user 118 receives from the electric energy supplier 120 a bill which is already marked down by the credit amount calculated by the certifier entity 110.

Figure 2:
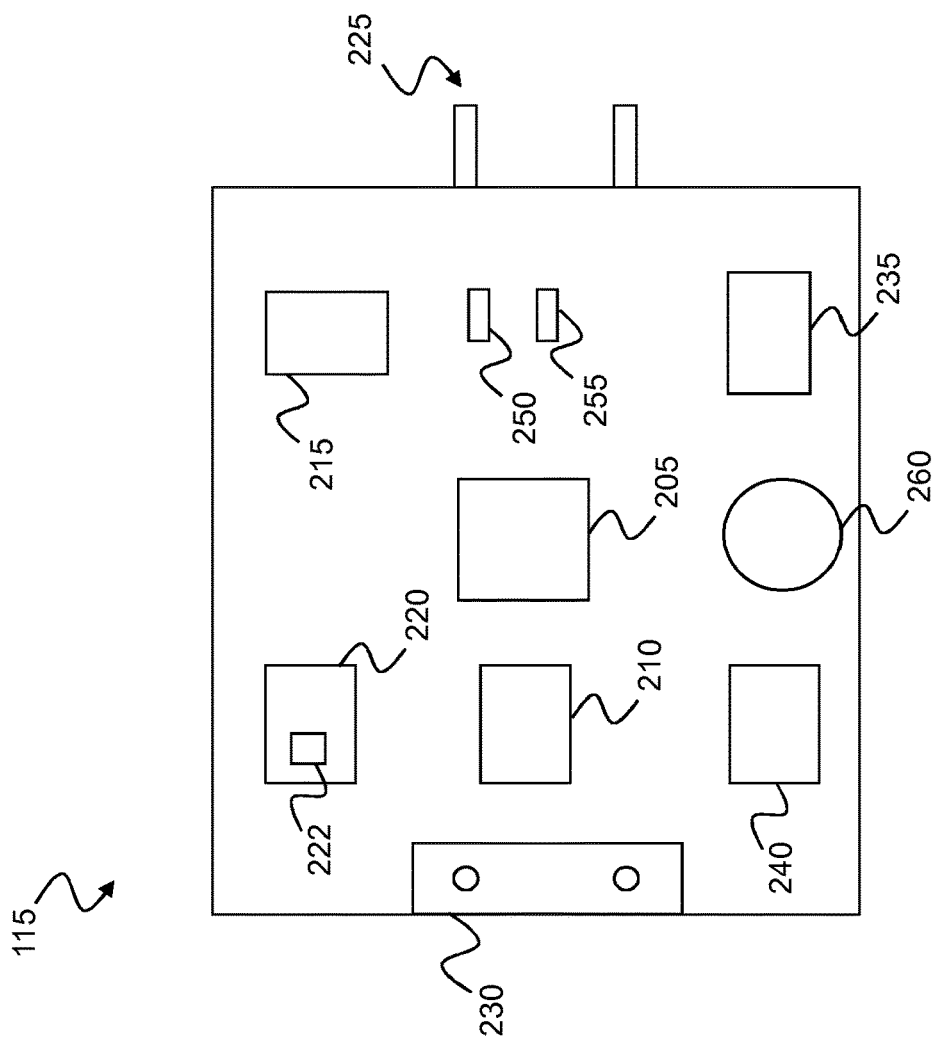
FIG. 2 schematically illustrates in terms of functional modules the electric meter device illustrated in FIG. 1 according to an embodiment of the present invention.

FIG. 2 schematically illustrates in terms of functional modules how an electric meter device 115 according to an embodiment of the present invention may be structured.

According to an embodiment of the present invention, the electric meter device 115 comprises a main control unit 205, such as a microprocessor, adapted to manage the operations carried out by the other modules of the electric meter device 115.

According to an embodiment of the present invention, the electric meter device 115 further comprises a communication module 210 configured to allow data communication between the electric meter device 115 and the connectivity platform 132 through the telecommunication network 135. For example, according to an embodiment of the present invention, the communication module 210 is SIM (subscriber identity module) based, such as comprising an eSIM (embedded SIM) or a on-chip-SIM. If the electric meter device 115 is mostly used indoor, a narrow-band-IoT SIM may be preferred. According to another embodiment of the present invention, the communication module 210 is not SIM based, but it requires however a communication system which has to replicate the security mechanisms provided by the SIM and by the connectivity platform 132.

According to an embodiment of the present invention, the electric meter device 115 further comprises a WORM/ROM (write once read many/read-only memory) memory device 215 for storing encryption/decryption keys. According to another embodiment of the present invention, the encryption/decryption keys may be stored in the SIM of the communication module 210. In this case, the WORM/ROM memory device 215 may be not necessary.

According to an embodiment of the present invention, the electric meter device 115 further comprises a non-volatile memory 220 storing a firmware/software module 222 comprising instructions for carrying out the abovementioned electric power fingerprint matching procedure directed to verify whether the electric apparatus connected to the electric meter device 115 is actually the one certifier entity 110 has univocally associated thereto or not, through the comparison of the actual electric power absorption of the connected electric apparatus with the reference electric power profile ARPP the certifier entity 110 has associated to the electric meter device 115.

According to an embodiment of the present invention, the firmware/software module 222 may be protected from fraudulent and unauthorized accesses and modifications through an anti-tampering system, for example exploiting signature and cryptography algorithms based on public/private keys stored in the WORM/ROM memory device 215 or in the SIM of the communication module 210. In this way, the installed firmware/software module 220 cannot be tampered, and cannot be modified through non-authorized updating operations, guaranteeing thus the correctness of the collected measures.

According to an embodiment of the present invention, the electric meter device 115 further comprises a power plug 225 adapted to be plugged into the power socket 130 connected to the power grid of the electric energy supplier 120 (see FIG. 1).

According to an embodiment of the present invention, the electric meter device 115 further comprises a power socket 230 adapted to receive the power plug 125 of the electric apparatus 105 (see FIG. 1). The power plug 225 and the power socket 230 are electrically coupled to each other, in order to allow the electric apparatus 105 to absorb electric power from the power grid of the electric energy supplier 120 when the power plug 125 of the electric apparatus 105 is plugged in the power socket 230 of the electric meter device 115 and the power plug 225 of the electric meter device 115 is plugged in the power socket 130 connected to the power grid of the electric energy supplier 120.

According to an embodiment of the present invention, the electric meter device 115 further comprises a measuring module 235 adapted to acquire electric power consumption data relating to the electric power absorbed by the electric apparatus 105 when the power plug 125 is plugged in the power socket 230 and the power plug 225 is plugged in the power socket 130. Preferably, the measuring module 235 is adapted to acquire data at high speeds, such as for example with an acquisition frequency of at least 10 kHz.

According to an embodiment of the present invention, the electric meter device 115 further comprises a power profile scrambling module 240 adapted to modify frequency components of the reference power profile of the electric apparatus 105 in such a way to avoid the possibility that two or more electric meter devices 115 are connected in cascade to a same electric apparatus 105 in order to illicitly receive more credit amounts for the same amount of consumed energy. Know examples of scrambling techniques adapted to modify the frequency components may be found in paper *"Energy-Aware Design Techniques for Differential Power Analysis Protection"* by L. Benini, E. Macii, et al., DAC 2003, June 2-6, 2003, Anaheim, Calif., USA, pages 36-41.

Instead of or in addition to the power profile scrambling module 240, a power line communication modem may be provided which is configured to broadcast a coded message when the electric meter device 115 is coupled to the electric apparatus 105 univocally associated thereto, and—at the same time—to listen over the power line for messages from other meter devices 115. According to an embodiment of the present invention, when the electric meter device 115 receives a message over power line from other devices, it notifies the user through a visual indicator (e.g. a LED) and stops supplying energy.

According to an embodiment of the present invention, the electric meter device 115 further comprises a first visual indicator (e.g., a LED) 250 which provides visual indications about the connected/disconnected status of the electric meter device 115 to the telecommunication network 135.

According to an embodiment of the present invention, the electric meter device 115 further comprises a second visual indicator (e.g., a LED) 255 which provides visual indications of when the electric apparatus 105 univocally associated to the electric meter device 115 is connected to the meter device 115.

According to an embodiment of the present invention, the electric meter device 115 further comprises a backup battery 260 for allowing data to be transmitted to the connectivity platform 132 when the electric meter device 115 is disconnected from the socket 130.

According to another embodiment of the present invention, instead of being a stand-alone device, the electric meter device 115 may be directly integrated in the electric apparatus 105.

Figure 3:
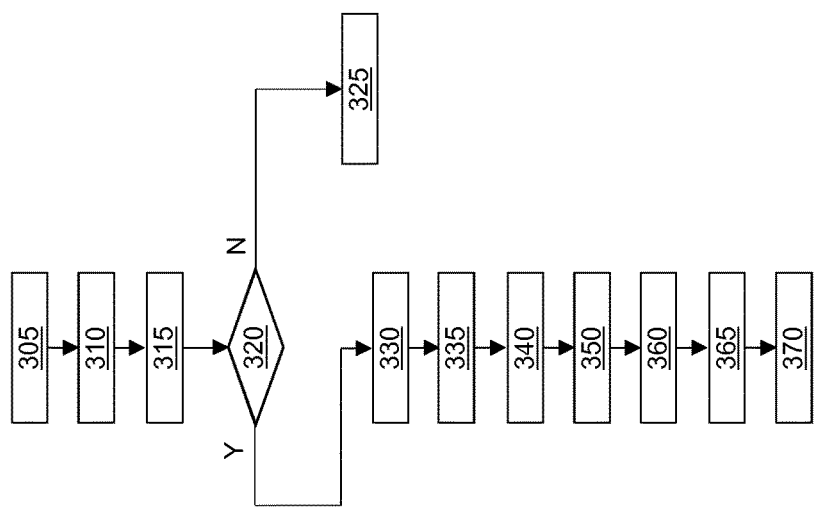
FIG. 3 is a flowchart illustrating the main operations carried out by the system of FIG. 1 according to an embodiment of the present invention.

FIG. 3 is a flowchart illustrating the main operations carried out by the system 100 of FIG. 1 in according to an embodiment of the present invention.

The first operation (block 305) provides for having the user 118 registering an electric apparatus 105 to the certifier entity 110.

The certifier entity 110 defines a reference power profile ARPP corresponding to said electric apparatus 105, and sends to the user 118 an electric meter device 115 univocally associated to the electrical apparatus 105 through said reference power profile ARPP (block 310). Since each different electric apparatus 105 corresponds to a different reference power profile ARPP, the firmware/software module 222 installed in the electric meter device 115 sent to the user 118 is properly configured by the certifier entity 110 to recognize the specific reference power profile ARPP corresponding to the electric apparatus 105 univocally associated to the electric meter device 115. The electric meter device 115 provided to the user 118 is also provided with a public key P of the certifier entity 110, for example stored in the non-volatile memory 220.

When the user 118 plugs the power plug 125 of the electric apparatus 105 into the power socket 230 of the electric meter device 115 and plugs the power plug 225 of the electric meter device 115 into the power socket 130 connected to the power grid of the electric energy supplier 120 for charging/supplying the electric apparatus 105, the electric meter device 115 starts the electric power fingerprint matching procedure by comparing the current electric power absorption of the connected electric apparatus 105 with the reference power profile ARPP the certifier entity 110 has associated to the electric meter device 115 (block 315).

If the current electric power absorption of the electric apparatus 105 does not match the reference power profile ARPP (exit branch N of block 320), it means that the electric apparatus which is under charging/supplying is different from the one univocally associated to the electric meter device 115. In this case, the electric meter device 115 warns the user through the second visual indicator 255, and the resulting charging/supplying of the electric apparatus 105 is not monitored nor taken into consideration for calculating any credit amount to be given to the user 118 (block 325).

If instead the current electric power absorption of the electric apparatus 105 matches the reference power profile ARPP (exit branch Y of block 320), it means that the electric apparatus which is under charging/supplying is the one that has been univocally associated to the electric meter device 115. In this case, the firmware/software module 222 generates a set of data DT corresponding to the electric energy consumption of the electric apparatus 105 measured through the measuring module 235 and certifies such set of data DT as energy consumptions corresponding to the electric apparatus 105 to which the electric meter device 115 has been univocally associated (block 330). For example, such set of data DT may comprise a customer identifier, an electric meter device identifier, amount of electric energy consumed in the period (i.e., kWh), start/end time, type/model of the electric apparatus, and so on.

According to an embodiment of the present invention, the set of data DT is encrypted by the electric meter device 115 with a symmetric key K (block 335). According to an embodiment of the present invention, said symmetric key K is modified for every set of data DT and stored in the WORM/ROM memory device 215. According to an embodiment of the present invention, the symmetric key K used to encrypt the set of data DT is encrypted using the public key P received from the certifier entity 110.

At this point, the encrypted set of data DT and the encrypted symmetric key K are transmitted to the connectivity platform 132 exploiting the communication module 210 (block 340). The connectivity platform 132 can be reached only by communication modules equipped with SIM specifically enabled for this kind of service. In addition, according to an embodiment of the present invention, the connectivity platform 132, which may be in this case a telecommunication provider platform, may enrich the received encrypted set of data with the geographic coordinates of the location wherein the measurements have been carried out, by means of, e.g., mobile network geolocation. According to another embodiment of the present invention, the geographic coordinates of the location wherein the measurements have been carried out may be also directly provided by the electric meter device 115. In this latter case, the electric meter device 115 has to be equipped with a module capable of calculating such geographic coordinates, such as a GPS module.

The transmission of the encrypted set of data DT and the encrypted symmetric key K to the connectivity platform 132 can be carried out in a single time, or in a sequence of times.

The connectivity platform 132 stores the received encrypted set of data DT and the encrypted symmetric key K in the data structure 140 (block 350). The write access to the data structure 140 is allowed only to the SIM specifically enabled for this kind of service. The data communication is carried out within a private network which is protected by the telecommunication provider. Authentication mechanisms of radio networks guarantee the origin of the communication and avoid any kind of tampering. Moreover, radio fingerprint mechanisms may be also used to increase the security of the transmission caused by possible SIM cloning.

At this point, the certifier entity 110 retrieves the received encrypted set of data DT and the encrypted symmetric key K from the data structure 140 (block 360).

The certifier entity 110 obtain the symmetric key K by decrypting it using a private key S matching the public key P, and uses said symmetric key K to decrypt the encrypted set of data DT and obtain said set of data DT (block 365)

The certifier entity 110 calculates a credit amount based on the received set of data DT (block 370).

As already mentioned above, such credit amount can be directly provided to the user 118 in case the electric energy provided by the electric energy supplier 120 has been already billed to the user 118 in a standard way by the electric energy supplier 120, or said credit amount can be communicated by the certifier entity 110 to the electric energy supplier 120 in such a way that the user 118 receives from the electric energy supplier 120 a bill which is already marked down by the credit amount calculated by the certifier entity 110.

According to an embodiment of the present invention, the certification entity 110 may provide the user 118 with a dedicated application software module or APP (application) 190 to be installed on a user equipment 195 of the user 118, such as a smartphone, a tablet or a personal computer. According to an embodiment of the present invention, such APP 190 may be used to allow the auto-installation/configuration of the electric meter device 115. When activated, the APP 190 instructs the user 118 to insert the electric meter device 115 in the socket 130 for carrying out a pairing procedure between the user equipment 195 and the electric meter device 115 (for example through the reading of a tag on the electric meter device 115 or the inputting of an identifier). Then, the APP 190 will provide the user 118 with a list of possible electric apparatuses 105 to be selected. The APP 190 will then communicate with the certifier entity 110 for triggering the beginning of a firmware provisioning/configuration phase. The APP 190 is capable of communicating with the electric meter device 115 through the wireless link or radio channel. By exploiting the APP 190, the user 118 is also able to check past charging/supplying operations and the corresponding credit amounts. In case the electric meter device 115 was directly integrated in the electric apparatus 105, the APP 190 may be directly available through a proper software interface of the electric apparatus 105 itself.

According to an embodiment of the present invention, the system 100 described above may provide a certified measures data market according to which the user 118 is remunerated if he/she makes available data generated by the electric meter device 115 to third parties.

FIG. 4A illustrates a first scenario in which a certified measures data market provides for a buyer catalog 405 wherein buyers 410(*i*) (insurance companies, consumers' associations) express their interest in buying the data generated by the electric meter device 115 by providing the price, the data typology, and the public key to be used for encrypting the symmetric key required to decrypt the data.

In this scenario, the user 118 is able to verify through the APP 190 buyers 410(*i*) having an interest in his/her data, and to accordingly decide to sell the right of reading such data (reading right) to one of the buyers 410(*i*) at the price set by said buyer 410(*i*).

During the reading right selling, the user 118 communicates to the buyer 410(*i*) the payment modality. According to a preferred implementation, the buyer catalog 405 may be a smart contract running on a blockchain.

A public key K_P of the buyer 410(*i*) is communicated to the electric meter device 115.

When the data is produced, the symmetric key K is encrypted with the public key K_P of the buyer 410(*i*) and sent to the connectivity platform 132, which stores it in the data structure 140.

The buyer 410(*i*) is able to retrieve the symmetric key K decrypting it with its private key, thus retrieving the data.

At this point, the buyer 410(*i*) pays the user 118.

According to a preferred implementation, the data retrieving/reading by the buyer 410(*i*) may be carried out by a smart contract for the automatic management of the payment to the user 118. In this case, the user 118 may be equipped with a wallet for the crediting through a reference cryptocurrency.

FIG. 4B illustrates a second scenario in which a certified measures data market provides that the user 118 communicates (during or after a buying phase, for example through the APP 190) his/her interest in selling data generated by the electric meter device 115 through a seller catalog 415. The seller catalog stores the electric meter device/SIM identifier, the kind of data to be sold, the selling authorization, the deposit coordinates, and the selling price. According to a preferred implementation, the seller catalog 415 may be on a blockchain, and may be also a smart contract.

A buyer 410(*i*) which is interested in buying data consults the seller catalog 415 and communicates the public key K_P of the buyer 410(*i*) to the electric meter device 115.

When the data is produced, the symmetric key K is encrypted with the public key K_P of the buyer 410(*i*) and sent to the connectivity platform 132, which stores it in the data structure 140.

The buyer 410(*i*) is able to retrieve the symmetric key K decrypting it with its private key, thus retrieving the data.

At this point, the buyer 410(*i*) pays the user 118.

According to a preferred implementation, the data retrieving/reading by the buyer 410(*i*) may be carried out by a smart contract for the automatic management of the payment to the user 118. In this case, the user 118 may be equipped with a wallet for the crediting through a reference cryptocurrency.

According to another embodiment of the present invention, the electric meter device 115 can be used to certify the time and the amount of energy that the electric vehicle has injected into the electric grid in a vehicle-to-grid scenario, i.e. when the storage capacity of the electric vehicle is used to provide a service to the balancing system operator.

According to another embodiment of the present invention, the electric meter device 115 may enable a specific energetic roaming for specific recharging points for smartphone and tablets (for example the electric meter device 115 may enable the recharging of only a specific smartphone or tablet model). Such energetic roaming may require a payment or may be sponsored.

According to another embodiment of the present invention, the electric meter device 115 may be employed in energetic roaming mechanisms and corresponding billing systems, according to which energy is payed based on where/when the recharging is carried out, and based on the type of electric apparatus 105.

Naturally, in order to satisfy local and specific requirements, a person skilled in the art may apply to the solution described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment.

The invention claimed is:

1. A method for managing the supply of electric energy to an electric apparatus by an electric energy supplier, comprising:

having a certifier system define a reference electric power profile of the electric apparatus which is indicative of a variation in an electrical consumption of the electric apparatus;

having the certifier system provide a device couplable to the electric apparatus and to a socket delivering electric energy provided by the electric energy supplier, said device being univocally associated to said electric apparatus through said reference electric power profile of the electric apparatus;

having a user of the electric apparatus couple, through said device, the electric apparatus to the socket for supplying electric energy;

having said device check if the electric apparatus coupled to the socket through the device is the electric apparatus to which the device itself has been univocally associated, by comparing a measured electric power profile of the electric apparatus with said reference electric power profile of the electric apparatus, and in case said check has a positive outcome, having the device collect measures about the electric power absorbed by the electric apparatus and certify them as energy consumptions corresponding to the electric apparatus to which the device itself has been univocally associated, wherein the certifier system defines the reference electric power profile of the electric apparatus and configures the device to recognize the reference electric power profile of the electric apparatus prior to the device being coupled to the electronic apparatus and the socket for supplying the electric energy.

2. The method of claim 1, further comprising billing the user for the electric energy supplied based on said certified collected measures.

3. The method of claim 1, further comprising modifying frequency components of the measured electric power profile of the electric apparatus.

4. The method of claim 1, further comprising having said device broadcast over power lines of the electric energy supplier a coded message when the device is coupled to the electric apparatus univocally associated thereto, and listen over the power lines for coded messages broadcasted by a second device.

5. The method of claim 1, further comprising:
having the certifier system obtain the certified collected measures collected by the device;
having the certifier system calculate a credit amount based on said retrieved certified collected measures; and
having the certifier system give said calculated credit amount to the user.

6. The method of claim 1, further comprising:
having the device encrypt the certified collected measures and transmit said encrypted certified collected measures to a connectivity platform.

7. The method of claim 6, further comprising:
having said connectivity platform store the encrypted certified collected measures into a data structure; and
having the certifier system retrieve the encrypted certified collected measures from the data structure and decrypt the encrypted certified collected measures to obtain said certified collected measures.

8. The method of claim 7, wherein said storing the encrypted certified collected measures into a data structure comprises storing the encrypted certified collected measures into a blockchain distributed data structure.

9. The method of claim 6, further comprising:
having said connectivity platform enriching the received encrypted certified collected measures with geographic coordinates of the location wherein the measures have been collected.

10. The method of claim 1, further comprising:
having buyers interested in buying said certified collected measures provide prices for said certified collected measures through a buyer catalog; and
having the user sell the right of reading said certified collected measures to a selected buyer among the buyers interested in buying said certified collected measures at the price provided in said buyer catalog by the selected buyer.

11. The method of claim 1, further comprising:
having the user provide prices for said certified collected measures through a seller catalog; and
having a buyer buy the right of reading said certified collected measures at the prices provided on said seller catalog.

12. A system for managing the supply of electric energy to an electric apparatus by an electric energy supplier, comprising:
a certifier system configured to define a reference electric power profile of the electric apparatus which is indicative of a variation in an electrical consumption of the electric apparatus;
a device couplable to the electric apparatus and to a socket delivering electric energy provided by the electric energy supplier, said device being univocally associated to said electric apparatus through said reference electric power profile of the electric apparatus, wherein:
said device is configured to check if the electric apparatus, when coupled to the socket through the device, is the electric apparatus to which the device itself has been univocally associated, by comparing a measured electric power profile of the electric apparatus with said reference electric power profile of the electric apparatus,
said device is further configured to collect measures about the electric power absorbed by the electric apparatus and certifying them as energy consumptions corresponding to the electric apparatus to which the device itself has been univocally associated if said check has a positive outcome, and
the certifier system defines the reference electric power profile of the electric apparatus and configures the device to recognize the reference electric power profile of the electric apparatus prior to the device being coupled to the electronic apparatus and the socket.

13. The system of claim 12, further comprising a connectivity platform, the device being further configured to encrypt the certified collected measures and transmitting said encrypted certified collected measures to the connectivity platform.

14. The system of claim 13, wherein:
said connectivity platform is configured to store the encrypted certified collected measures into a data structure; and
the certifier system is configured to retrieve the encrypted certified collected measures from the data structure and decrypt the encrypted certified collected measures to obtain said certified collected measures.

15. A device couplable to an electric apparatus and to a socket delivering electric energy provided by an electric energy supplier, said device being univocally associated to said electric apparatus through a reference electric power profile of the electric apparatus which is indicative of a variation in an electrical consumption of the electric apparatus defined by a certifier system, the device comprising:

a controller configured to:
check if the electric apparatus, when coupled to the socket through the device, is the electric apparatus to which the device itself has been univocally associated, by comparing a measured electric power profile of the electric apparatus with said reference electric power profile of the electric apparatus, and collect measures about the electric power absorbed by the electric apparatus and certify said collected measures as energy consumptions corresponding to the electric apparatus to which the device itself has been univocally associated if said check has a positive outcome, wherein the certifier system defined the reference electric power profile of the electric apparatus and configured the device to recognize the reference electric power profile of the electric apparatus prior to the device being coupled to the electronic apparatus and the socket.

16. The method of claim 1, wherein said check has the positive outcome when the measured electric power profile of the electric apparatus matches said reference electric power profile.

17. The method of claim 1, further comprising in case said check has a negative outcome, having the device not collect the measures about the electric power absorbed by the electric apparatus.

18. The method of claim 17, wherein
said check has the positive outcome when the measured electric power profile of the electric apparatus matches said reference electric power profile; and
said check has the negative outcome when the measured electric power profile of the electric apparatus does not match said reference electric power profile.

\* \* \* \* \*